Figure 1:
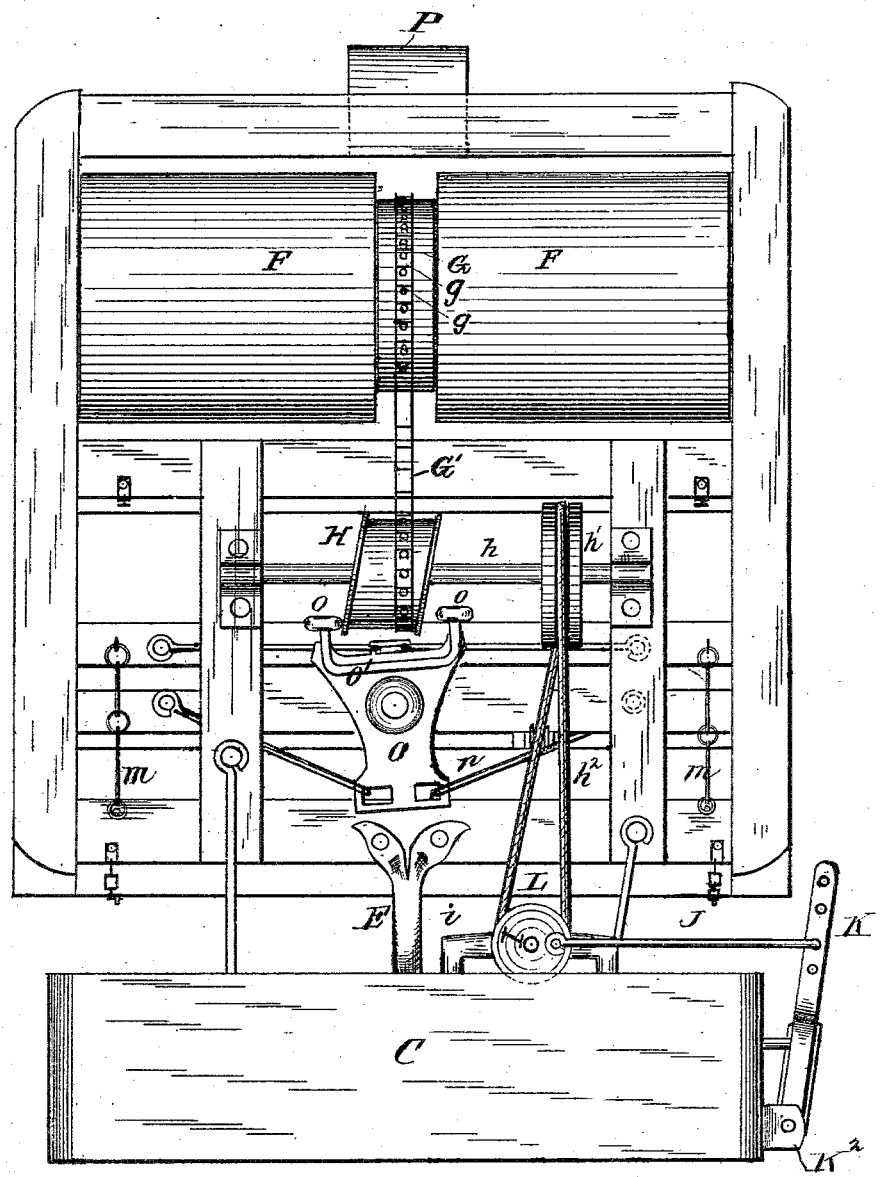

(No Model.) 2 Sheets—Sheet 1.

A. P. GROVER.
COMBINED SEEDER, HARROW, AND ROLLER.

No. 286,427. Patented Oct. 9, 1883.

Witnesses:
Wm. S. Duvall
Howard S. Reeside

Inventor:
Albert P. Grover
Per Edson Bros,
attys.

(No Model.)
A. P. GROVER.
COMBINED SEEDER, HARROW, AND ROLLER.
No. 286,427. Patented Oct. 9, 1883.
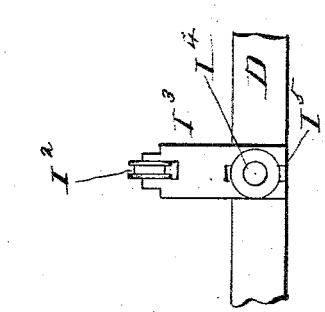
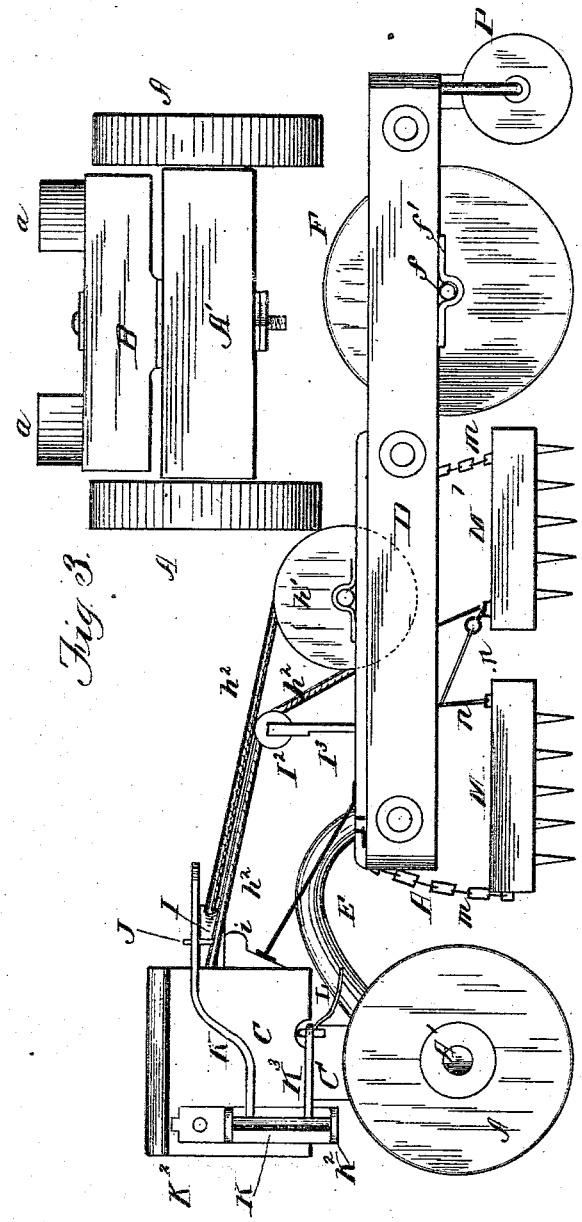
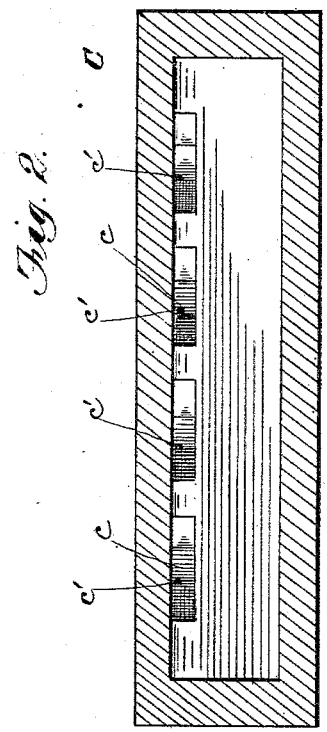
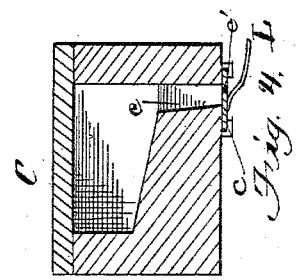
Witnesses:
Inventor:
Albert P. Grover
per Edson Bros.
att'ys.

UNITED STATES PATENT OFFICE.

ALBERT P. GROVER, OF EUREKA, WISCONSIN.

COMBINED SEEDER, HARROW, AND ROLLER.

SPECIFICATION forming part of Letters Patent No. 286,427, dated October 9, 1883.

Application filed June 2, 1883. (No model.)

*To all whom it may concern:*

Be it known that I, ALBERT P. GROVER, a citizen of the United States, residing at Eureka, in the county of Winnebago and State of Wisconsin, have invented certain new and useful Improvements in a Combined Seeder, Harrow, and Roller; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in combined harrows, seeders, and rollers, having for its object to cause the automatic dropping of the seed, to thoroughly harrow or pulverize the soil, and to properly embed the seed and pack the earth to promote or hasten the germination of the seed; and it consists in the combination and arrangement of parts, substantially as hereinafter more fully set forth and claimed.

In the accompanying drawings, Figure 1 represents a top or plan view of my improved combined harrow, seeder, and roller. Fig. 2 is a side elevation, and Fig. 3 is a front elevation, of the front axle, wheels, and bolster. Fig. 4 is a transverse section of the seed-receptacle. Fig. 5 is a longitudinal section of the same, and Fig. 6 is a detail of my invention.

Referring to the drawings, in which similar letters of reference indicate like parts, A designates a pair of wheels, to the axle A' of which the draft is applied by any suitable means.

Upon the axle A' is swiveled a bolster, B, upon low studs or blocks $a$ of which is secured the seed-box C. The seed-receptacle is provided with a sloping bottom, as clearly shown in Fig. 4, to insure the passage of the seed into the seed-apertures $c$, arranged in the rear portion of the bottom. A slide, $c'$, having perforations $c'\, c'$, is arranged to reciprocate, by means of mechanism hereinafter described, upon the bottom of the seed-box C, and is provided with apertures coinciding with like openings in the bottom of the seed-box.

A frame, D, is connected to the bolster B and supported at its front end by a reach, E, with a curvature adapted to permit the wheels to turn under it, and so as to describe any part of or a complete circle in their movement in turning the machine. The frame D is supported at its rear end upon the common axle $f$ of a pair of rollers, F F, said axle bearing in journals $f'$, secured to the under side of the frame D.

Rigidly secured to the axle $f$, and to one of the rollers F, is a drum, G, having studs $g$, which are adapted to engage with the links of an endless chain, G', which passes around and communicates motion to a drum-shaped cam, H, also having teeth to engage the said chain, and rigidly secured to the shaft $h$, journaled in suitable bearings in the frame D. A pulley or band-wheel, $h'$, is also secured to the shaft $h$, and communicates motion by means of a belt, $h^2$, to an eccentric wheel, I, supported upon a bracket, $i$. To give the proper direction to the lower portion of the belt $h^2$ to conduct it from the vertical pulley $h'$ to the horizontal eccentric wheel I, a pulley, $I^2$, is suitably disposed with relation thereto. The pulley $I^2$ is journaled in a standard, $I^3$, adjustably connected, by a set-screw, $I^4$, passed through a slot, $I^5$, in the standard, to the frame D. It is obvious that the adjustability of the pulley-standard will permit of regulating the tension of the pulley on the belt. The eccentric wheel I is eccentrically connected by a rod, J, to a bent lever, K, in any one of a series of apertures in said lever. This lever is connected to a short shaft, K', journaled in a bracket, K², secured to one end of the seed-box. The shaft K' is connected by a pitman, K³, to the seed-slide C', which is reciprocated by motion transmitted through the shafts, belts, and eccentric wheel from the rollers. The length of the stroke of the seed-slide and quantity of seed discharged are regulated by adjusting the rod J in the apertures in the lever K. A grain-board, L, is secured upon the under side of the seed-slide to sow the seed broadcast into the ground.

The harrows M are of any preferred construction, and are suspended from the frame D by chains or ropes $m$, and from the plate O, pivoted upon the frame, by rods $n$, said rods engaging with eyes formed in the front and back portions of the said plate, as clearly shown. The plate O is provided with a yoke, O', having frictional rolls $o\, o$, which impinge upon the side walls of the drum-shaped cams H on the shaft $h$. An oscillating motion is given to the plate O by the cam H acting alternately upon the friction-rolls o o, by which a reciprocating motion is imparted through the rods n to the harrows M, whereby the harrowing of the soil is thoroughly performed. The ground is firmly rolled or pressed, after the seed have been dropped, by the rollers F F passing over the same, properly embedding the seed into the ground to promote or hasten the germination of the seed.

Suspended from the frame D, in the rear of the rollers F F, is a supplemental roller to roll or pack the ground between the rollers F F.

I am aware that it is not broadly new to reciprocate a seed-slide and bars having harrow-teeth by means of cams of different forms, or by a lever operated by a roller having fluted ends which engage with a friction-roller on one end of said lever, the latter being connected with the seed-slide and harrow-frame.

Having thus fully described my invention, what I claim, and desire to secure by Letters Patent, is—

1. In an agricultural implement, the land-rollers, driving-belt, and drum-shaped cam, in combination with the pivoted plate having arms adapted to be operated by said cam, which is arranged between said plate and the driving-rollers, and the harrows connected to said pivoted plate, at both ends thereof, by rods or equivalent means, substantially as and for the purpose set forth.

2. In an agricultural machine, the land-roller, driving-belt, the drum-shaped cam, and pulley, in combination with the second driving-belt, the eccentric wheel, the connecting-rod, the lever, short shaft, the pitman, the seed-slide, the pivoted plate having a yoke, and the suspended harrows connected by chains or equivalents to the pivoted plate, substantially as and for the purpose set forth.

In testimony whereof I affix my signature in presence of two witnesses.

ALBERT P. GROVER.

Witnesses:
  MILO CARLEY,
  A. L. H. WALPOT.